May 23, 1933.  W. B. THIEMANN  1,910,371
RAKE
Filed May 19, 1930
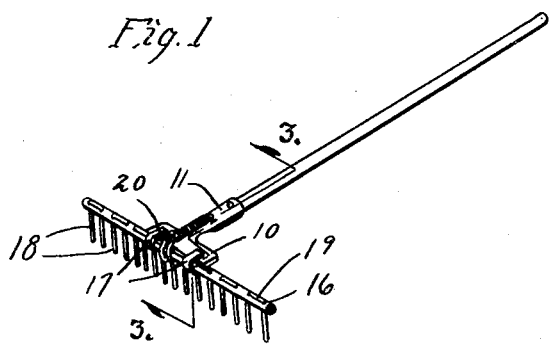
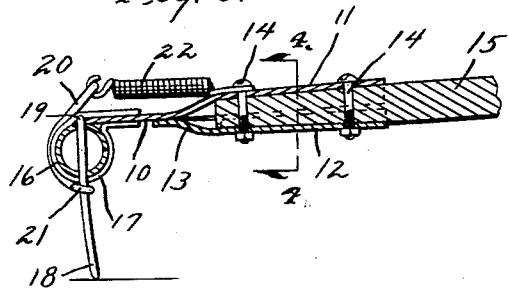
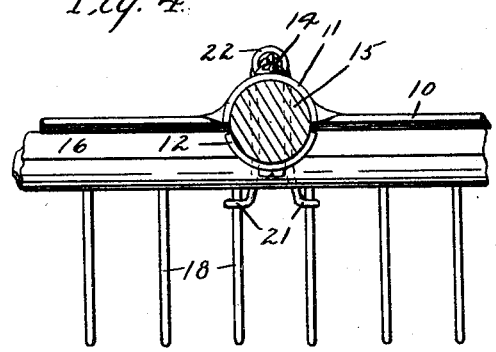
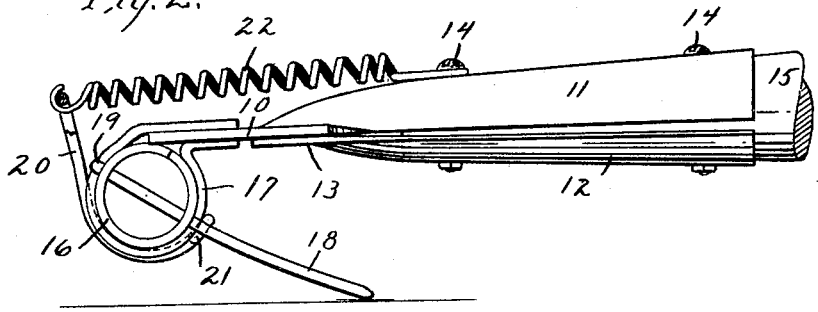
Inventor
William B. Thiemann
by Orwig & Hague Attys Patented May 23, 1933

1,910,371

UNITED STATES PATENT OFFICE

WILLIAM B. THIEMANN, OF ALBERT CITY, IOWA

RAKE

Application filed May 19, 1930. Serial No. 453,604.

The object of my invention is to provide a rake of simple, durable and inexpensive construction, so constructed and arranged that trash gathered and lodged in the rake teeth may be easily and quickly delivered from the rake as it is moved outwardly from the operator.

A further object is to provide a self-cleaning rake constructed largely of pressed sheet metal for the purpose of lightening the rake, and also cheapening its construction.

A further object is to provide in a self-cleaning rake improved means for securing the rake head to the handle.

My invention consists in the construction, arrangement and combination of the various parts of the device, whereby the objects contemplated are attained, as hereinafter more fully set forth, pointed out in my claim, and illustrated in the accompanying drawing, in which:

Figure 1 is a perspective view of my improved rake.

Figure 2 is an end elevation of the same.

Figure 3 is a detail sectional view taken on the line 3—3 of Figure 1.

Figure 4 is a detail sectional view taken on the line 4—4 of Figure 3.

My improved rake comprises a head plate 10, preferably formed of stamped sheet metal. The back edge of the head 10 is provided with a laterally extending portion 11 shaped and curved to form one member of a handle ferrule. A coacting ferrule member 12 is provided, which is also formed of sheet metal. The member 12 is provided with a forwardly extending portion 13 riveted or otherwise secured to the head 10. Bolts 14 provide means for securing the ferrule members 11 and 12 to the handle 15.

Thus a simple, inexpensive and strong ferrule member is provided, which may be easily and quickly attached to the rake handle by inserting the bolts 14. Said bolts firmly clamp the ferrule members to the rake handle and provide means whereby the ferrules may be rigidly and firmly clamped to handles of various sizes. The bolts prevent loosening caused by swelling and shrinking of the wooden handle.

Adjacent to the forward edge of the head plate 10 I have provided a tubular tooth bar 16 pivotally secured in position by means of straps 17 surrounding the bar 16. The ends of the straps are welded or otherwise fastened to the head 10. The bar 16 is provided with a series of laterally projecting teeth 18. The teeth are formed preferably of wire bent to form substantially U-shaped members. The tooth bar is inserted through suitable holes in the bar 16 and rigidly fastened in position. The bar 16 is also formed of sheet metal pressed into tubular shape.

By this means of mounting the teeth in the bar 16, it will be seen that portions 19 rest longitudinally on top of the bar 16. Said portions of the central teeth are designed to rest against the edge of the head member 10 in the manner clearly illustrated in Figure 3.

A wire yoke 20 is provided, the free ends of which have loop portions 21 designed to receive the two center teeth of the rake bar, and provide means for attaching one end of a spring 22, in the manner clearly illustrated in Figure 3. The opposite end of the spring is secured to one of the bolts 14.

The spring 22 yieldably supports the teeth 18 in an upright position with the portions 19 adjacent to the forward edge of the member 10, in such manner that if the rake is supported with the ends of the teeth 18 on the ground surface, and the rake is drawn toward the operator, then trash will be moved inwardly in the usual manner.

However, if the rake is moved outwardly away from the operator with the teeth still engaging the ground surface, then the spring 22 will yield, permitting the teeth 18 to assume an inclined position, as illustrated in Figure 2, permitting any trash collected between the teeth to be dislodged.

Thus it will be seen that I have provided a rake of simple, durable and inexpensive construction, which is effective for raking purposes, and at the same time having means whereby the teeth may be easily and quickly cleaned.

I claim as my invention:

A rake comprising a head plate, a handle therefor, a tooth bar rotatably supported adjacent to one edge of said head plate, teeth for said tooth bar, a yoke having loops formed in the ends of its legs, said legs being curved to conform to the outer surface of said tooth bar with the closed portion of said yoke supported tangentially from said tooth bar, the loop portions of said legs being each slidably supported on one of the teeth of said tooth bar, and a spring having one end secured to the closed portion of said yoke and its opposite end secured to said handle.

Des Moines, Iowa, April 4, 1930.

WILLIAM B. THIEMANN.